United States Patent Office 3,231,600
Patented Jan. 25, 1966

3,231,600
SYNTHESIS OF AROMATIC NITRILES
Daniel G. Jones, Haddonfield, and Phillip S. Landis, Woodbury, N.J., assignors to Socony Mobil Oil Company, Inc., a corporation of New York
No Drawing. Filed Feb. 2, 1962, Ser. No. 170,794
12 Claims. (Cl. 260—465)

This invention is related to the catalytic synthesis of aromatic nitriles and dinitriles. It is more particularly concerned with the production of nitriles from alkylaromatic compounds and ammonia in the presence of a novel catalyst series.

The aromatic nitriles contemplated herein are materials having the formula, $R(C\equiv N)_n$, wherein R is an aromatic radical, such as phenyl, phenylene, tolyl, tolylene, naphthyl, and naphthylene and $n$ is 1 or 2 pyridyl. The nitriles, notably benzonitrile, find extensive use in resins and plastics manufacture. They are excellent solvents for many materials such as Bakelite, chlorinated rubber, rosin, and Lucite. They are also intermediates for a wide variety of organic compounds. Upon reduction, the corresponding amine is formed. Hydrolysis produces amides, which in turn can be converted into acids. Thus, from benzonitrile there can be produced benzylamine, benzamide, and benzoic acid.

As is well known to those familiar with the art, it has been proposed to prepare nitriles catalytically by the gas phase reaction of toluene, xylene, etc. with ammonia. The catalysts proposed have included one or more oxides of molybdenum, vanadium, tungsten, or uranium, usually upon a refractory oxide support. Yields of up to about 10 percent nitrile per pass have been obtained, but usually per pass yields were less than five percent. Reasonable ultimate yields have been obtained, but this has required recycling large amounts of unconverted alkylaromatic hydrocarbons. As those skilled in the art will readily appreciate, it is highly desirable to achieve higher yields per pass, thus avoiding extensive recycling and achieving better ultimate yields.

It has now been found that aromatic nitriles can be produced in good per pass yields, simply and economically. It has been discovered that alkylaromatic hydrocarbons, such as toluene, and ammonia can be converted in good yields into nitriles, in the presence of certain heavy metal containing catalysts.

Accordingly, it is an object of this invention to provide a process for producing aromatic nitriles and dinitriles. Another object is to provide a catalytic method for producing aromatic nitriles and dinitriles in high per pass yields. A specific object is to provide a catalytic process for producing aromatic nitriles and dinitriles from alkylaromatic compounds and ammonia. Another specific object is to provide a process for producing aromatic nitriles by contacting alkylaromatic compounds and ammonia with certain heavy metal containing catalysts. A more specific object is to provide a process for producing benzonitrile or benzodinitrile by contacting toluene or xylene and ammonia with certain crystalline zeolites of the molecular sieve type. Other objects and advantages of this invention will become apparent to those skilled in the art, from the following detailed description.

In general, this invention provides a process for producing aromatic nitriles that comprises contacting ammonia and an alkylaromatic compound, in a molar ratio of ammonia to said compound of about 2:1 and upwards, at a temperature varying between about 850° F. and about 1200° F., and for a contact time, varying between about 0.01 second and about 20 minutes, with a semi-porous refractory solid having a heavy metal ion capable of forming a Werner ammine complex ionically combined therewith.

The aromatic compound reactants contemplated herein are alkyl-substituted aromatic hydrocarbons and heterocyclic aromatic compounds otherwise unsubstituted. These compounds are made up of carbon, hydrogen, and heterocyclic atoms. Generally speaking, any aromatic compound having at least one nuclear hydrogen atom replaced by an alkyl hydrocarbon radical is suitable for the alkylaromatic reactant in the process of this invention. The aromatic compounds can be derived from any suitable source, as is well known to those familiar with the art. Although any aromatic compound having at least one nuclear hydrogen atom replaced by an alkyl is contemplated, it is preferred to use methyl-substituted aromatic compounds having at least seven and up to eleven, inclusive, carbon and heterocyclic atoms per molecule; more particularly the thus-substituted benzenes. Non-limiting examples of the alkylaromatic compound reactant are toluene, ethylbenzene, diethylbenzene, xylenes, trimethylbenzenes, methylnaphthalene, and methylanthracene. Examples of alkyl-substituted heterocyclic compound reactants are methylpyridine, lutidine-2,5, lutidine-2,4, methylthiophene, methylfuran, methyloxazole, and 2-methylpyrimidine. Fractions containing methyl-aromatic compound reactants are contemplated herein, such as, for example, aromatic hydrocarbon fractions.

In order to ensure a reasonable yield of nitrile per pass, in the order of about 15 percent or more, a molar excess of ammonia over the aromatic hydrocarbon reactant is highly desirable. The amount of excess ammonia, however, can vary rather widely dependent upon the metal component of the catalyst (as described hereinafter) and upon the aromatic hydrocarbon reactant used. For example in the production of benzonitrile, when the catalyst contained zinc, high conversion per pass was obtained using a molar ratio of ammonia to toluene as low as 13:1. On the other hand, catalysts containing nickel required ammonia:toluene ratios of about 100:1. In general, depending upon the aforementioned factors, molar ratios of ammonia to aromatic hydrocarbon reactant of about 2:1 and upwards to about 200:1 are used. Preferably, the molar ratio will be between about 10:1 and about 100:1.

Generally, the catalysts contemplated herein are semi-porous refractory solids having a heavy metal ion capable of forming a Werner ammine complex ionically combined therewith. In order to be effective catalysts the catalytic metal site must be accessible to the reactants. This is readily achieved when the catalyst has pore openings of at least about 6 Angstrom units (A.U.) in diameter, but catalysts having pore diameters as low as 3 A.U. are effective at relatively lower yield. Also, sufficient access to catalytic sites is achieved by increasing surface area, as by grinding to small particle size of smaller than about 500 microns, and preferably smaller than about 200 microns. At least 20 percent of the ion-exchangeable metal content of the catalyst should be in the form of the heavy metal capable of forming the Werner ammine complex. The catalysts can be crystalline or amorphous and naturally occurring or synthetic. They can be obtained in a number of ways.

Thus, the catalyst can be a mineral containing a Werner complex metal (i.e., a metal capable of forming the Werner ammine complex) in its lattice such as gahnite, almandite, siderite, etc. The catalyst can be prepared by ion exchanging a mineral with the desired Werner complex metal. Such minerals include margerite, glauconite, montmorillonite, tourmaline, sepentine, wernerite, vesuvianite, zeolites, and spinel. Also, the catalyst can be obtained by ion exchanging a Werner complex metal with a synthetic composite, such as synthetic zeolites and spinels. The zeolites and spinels are a preferred form of catalyst for this invention.

Some natural spinels contain Werner complex metals in their lattices and can be used as such. Others can be synthesized or they can be produced by ion exchange with a natural or synthetic spinel. The spinels have the formula MM'$_2$O$_4$, wherein M can be Zn, Mg, Mn, Fe, Ni, Co, or Cd and M' can be Al, Co, Fe, Cr, or Ga. Naturally occurring spinel, MgAl$_2$O$_4$, is quite abundant and can be ion exchanged to replace magnesium ions with ions of Werner complex metals. Typical spinel catalysts contemplated are gahnite, FeFe$_2$O$_4$, ZnAl$_2$O$_4$, and the like.

The zeolites can be defined as three-dimensional aluminosilicates in which the rigid crystalline structure is not destroyed, collapsed, or substantially altered when essentially all the water of hydration is removed from the pores within the crystal lattice. The zeolite can be naturally occurring or synthetic, or a combination thereof. Naturally occurring zeolites usually contain sodium ions or calcium ions, or both. They can be ion exchanged with Werner complex metals to form catalysts for the process of this invention. Typical zeolites are natrolite, scolecite, analcite, thomsonite, heulandite, mordenite, stilbite, chabazite, gmelinite, levynite, and faujasite.

Synthetic zeolites are usually prepared in the alkali metal form, usually the sodium form, or in the calcium form, Particularly desirable synthetic zeolites are those which are known as "molecular sieves." Zeolitic molecular sieves suitable for making the catalyst for the process of this invention are synthetic zeolites having substantially uniform pore diameter of between about 3 and about 15 A.U. A typical synthetic zeolitic molecular sieve is type 13X molecular sieve (about 13 A.U. pore size), available commercially from Linde Air Products Company. In United States Letters Patent No. 2,882,244, the "zeolite X" is fully described and characterized and details for preparing it are set forth. Reference should be made to said patent for information on this type zeolitic molecular sieve. The formula for this zeolite is:

$$0.9 \pm 0.2 M_{2/n}O : Al_2O_3 : 2.5 \pm 0.5 SiO_2 : YH_2O$$

In this formula "M" represents a metal, "n" its valence, and "Y" may be any value up to 8, depending on the identity of the metal and the degree of hydration of the crystal.

Often the semi-porous, refractory solids are obtained, or prepared, in the alkali metal or the alkaline earth metal form. Thus, in order to produce catalysts utilizable herein, they must be converted, at least to the extent of about 20 weight percent of the metal content, into the salt of a heavy metal capable of forming a Werner ammine complex. These metals are the heavy metals having atomic numbers of 23 through 30, inclusive, 43 through 48, inclusive, and 75 through 80, inclusive. Particularly effective among these metal cations are chromium, cobalt, nickel, copper, zinc, palladium, silver, and platinum.

The semi-porous refractory solids can be readily converted into the heavy metal salts by well-known ion exchange methods. Typical procedures are described, for example, in U.S. Patent No. 2,882,244. Usually, the sodium, or other alkali or alkaline earth metal form of the zeolite is contacted with aqueous solutions of water-soluble salts of the desired cation. However, other solutions containing the desired cation can be used. In some cases, the zeolite can be ion exchanged with ammonium hydroxide and then with solutions containing the cation. For example, sodium zeolite X was exchanged with an aqueous solution of ammonium chloride and then with alcoholic chromium trichloride solution.

The catalysts used in the process of this invention can be used alone, without a support or carrier. It is also contemplated to utilize catalysts described hereinbefore deposited upon a refractory support or carrier. Likewise, the catalyst can be composited with a binder, such as clays.

The heavy metal catalyst is readily activated by heating in air or vacuum or other appropriate gas. Temperatures up to about 700° C. (about 1292° F.) have been found to be satisfactory. During use, the catalyst will become coked and lose its activity. In the same manner as initial activation the coked catalyst can be regenerated by heating at about 1000° F. in the presence of air or other oxygen-containing gas. Thus, the catalyst is readily adaptable to a moving bed process wherein catalyst is continuously cycled through a reactor into a regeneration unit and then recycled to the reactor; or to a fluidized process utilizing similar catalyst cycle.

In general, the temperatures to be used in the process of this invention vary between about 850° F. up to the decomposition temperature of ammonia (about 1250° F.), and preferably, between about 925° F. and about 1075° F. The preferred temperature to be used in any particular operation will depend upon the nature of the alkylaromatic reactant used and upon the type of catalyst employed. Generally speaking, the higher temperatures increase the conversion per pass but they also increase the decomposition of the reactants, thereby decreasing the ultimate yields of aromatic nitriles. Accordingly, the criteria for determining the optimum temperature to be used in any particular operation will be the nature of the alkylaromatic reactant, the type of catalyst, and a consideration of commercial feasibility from the standpoint of striking a practical balance between conversion per pass and losses to decomposition.

The reaction or contact time, i.e., the period of time during which a unit volume of the reactants is in contact with a unit volume of catalyst, can vary between a fraction of a second and several minutes. Thus, the contact time can be as low as 0.01 second and as high as 20 minutes. It is preferred to use contact times varying between 0.1 second and one minute, particularly between 0.3 second and 30 seconds. For all practical purposes, as in catalytic processes of the type of the present invention, contact time is expressed in terms of liquid hourly space velocities, in the present case the volume of liquid reactant per volume of catalyst per hour. For example, at atmospheric pressure, space velocities can be varied considerably, and velocities varying between about one-fourth and about 4 are quite satisfactory for purposes of the present invention.

The process of this invention may be carried out at subatmospheric, atmospheric, or superatmospheric pressures. Superatmospheric pressures are advantageous in that the unreacted charge materials condense more readily. Subatmospheric pressures appear to favor the reaction involved, as the reaction products have a larger volume than the reactants. Hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric or superatmospheric pressures are preferred.

The process of this invention can be carried out using any of the well-known techniques for operating vapor phase processes. Thus, the process can be carried out batchwise or continuously. Typical techniques are described in various patents, such as in United States Letters Patent No. 2,450,677, particularly from column 7, line 34, through column 8, line 31. Reference is made to such patents for typical process techniques and manipulations.

The following examples are for the purpose of illustrating the preparation of nitriles in accordance with the process of this invention. It is to be clearly understood that this invention is not to be limited to the specific aromatic hydrocarbons or catalysts, or to the manipulations and operations set forth in the examples. As it will be apparent to those skilled in the art, other catalysts of the type defined herein can be used, and a variety of other aromatic nitriles can be prepared by suitable modifications of the aromatic compound reactants, as is described hereinbefore.

The process of this invention will be illustrated by the reaction of ammonia and toluene to form benzonitrile. Each run was carried out at atmospheric pressure, as follows:

The ammonia gas was measured by a rotameter and bubbled through a glass vessel containing toluene. The temperature of the toluene was adjusted to control the ammonia:toluene molar ratio. The ammonia thus admixed with toluene was passed into the top of a vertical heat resistant high-silica glass (Vycor) tubular reactor of 15 mm. I.D. with a 6 mm. O.D. thermowell extending through the length of 20 cm. The reactor was loaded with a 2–3 cm. preheater section of alumina chips and 20 ml. of catalyst.

The reactor was preheated at 700° F. for an hour with nitrogen. Then ammonia was passed through and the temperature of the reactor was raised to about 1000° F. When this temperature was reached, the ammonia was passed through the toluene and then into the reactor to commence the run. The runs were carried out at about 1000° F., using contact time of about 2–4 seconds. The exit vapors were condensed and liquid product was separated. The amount of benzonitrile was determined by vapor phase chromatography, the balance of the liquid effluent being substantially recyclable toluene.

*Examples 1 and 2*

A commercial sodium form type 13X zeolitic molecular sieve (Linde Air Products Company) was ion exchanged with an aqueous solution of zinc chloride. The type 13X zeolite is a sodium alumino-silicate having a pore diameter of between 7 and 15 A.U. and contains about 20 weight percent clay binder. The ion exchanged zeolite had, on the exchangeable sites, 57% sodium and 43% zinc.

Toluene and ammonia, in a molar ratio of ammonia to toluene of 13:1, was contacted with this zinc catalyst in the vertical reactor, as aforedescribed. There was obtained 73 percent yield of benzonitrile per pass.

Another run was made with this zinc catalyst, wherein the molar ratio of ammonia to toluene was 30:1. In this run above 35 percent yield of benzonitrile was obtained per pass. About one percent of the toluene was converted to benzene, the balance of the liquid product (about 63.8 percent) being unreacted toluene. This amounts to an ultimate yield greater than 95 percent.

It will be noted that high per pass yields of benzonitrile are achieved in the process of this invention. The amount of degradation products (benzene, etc.) is exceedingly small. It will be appreciated that, by proper use of recycle with fresh feed make-up, ultimate conversion based on fresh feed will approach 100 percent.

*Example 3*

Commercial sodium form type 13X zeolitic molecular sieve was ion exchanged with an aqueous solution of silver nitrate. The ion exchanged zeolite had, on the exchangeable sites, 5% sodium and 95% silver.

Toluene and ammonia, in a molar ratio of ammonia to toluene of 20:1, was contacted with this silver catalyst in the vertical reactor, as aforedescribed. There was obtained 46 percent yield of benzonitrile per pass.

*Example 4*

Commercial sodium form type 13X zeolitic molecular sieve was ion exchanged with an aqueous solution of nickel nitrate. The ion exchanged zeolite had, on the exchangeable sites, 37% sodium and 63% nickel.

Toluene and ammonia, in a molar ratio of ammonia to toluene of greater than 100:1, was contacted with this nickel catalyst in the vertical reactor, as aforedescribed. There was obtained 19 percent yield of benzonitrile per pass.

*Example 5*

Commercial sodium form type 13X zeolitic molecular sieve was ion exchanged with an aqueous solution of cobalt nitrate. The ion exchanged zeolite had, on the exchangeable sites, 24% sodium and 76% cobalt.

Toluene and ammonia, in a molar ratio of ammonia to toluene of greater than 100:1, was contacted with this cobalt catalyst in the vertical reactor, as aforedescribed. There was obtained 14 percent yield of benzonitrile per pass.

*Example 6*

Commercial sodium form type 13X zeolitic molecular sieve was first ion exchanged with an aqueous solution of ammonium chloride. The thus exchanged zeolite was then ion exchanged with an alcoholic solution of chromic chloride. The ion exchanged zeolite had, on the exchangeable sites, 30% sodium, 14% ammonium, and 56% chromium.

Toluene and ammonia, in a molar ratio of ammonia to toluene of greater than 100:1, was contacted with this chromium catalyst in the vertical tube reactor, as aforedescribed. There was obtained 20 percent yield of benzonitrile per pass.

*Example 7*

Using the procedure set forth in Example 6, another chromium type X zeolite catalyst was prepared. It contained, on the exchangeable sites, 30% sodium, 34% ammonium, and 36% chromium.

Toluene and ammonia, in a molar ratio of ammonia to toluene of 5:1, was contacted with this chromium catalyst in the vertical tube reactor, as aforedescribed. There was obtained 7.7 percent yield of benzonitrile per pass.

*Example 8*

Commercial sodium form type 4A zeolitic molecular sieve (Linde Air Products Company) was ion exchanged with an aqueous solution of silver nitrate. This type 4A zeolite has a pore diameter of about 4 A.U., too small to admit toluene. The ion exchanged zeolite had, on the exchangeable sites, 21% sodium and 79% silver.

Toluene and ammonia, in a molar ratio of ammonia to toluene of greater than 100:1, was contacted with this silver catalyst in the vertical tube reactor, as aforedescribed. There was obtained 0.9 percent yield of benzonitrile per pass.

*Example 9*

Commercial sodium form type 4A zeolitic molecular sieve was ion exchanged with an aqueous solution of nickel nitrate. The ion exchanged zeolite had, on the exchangeable sites, about 75% sodium and about 25% nickel.

Toluene and ammonia, in a molar ratio of ammonia to toluene of 8:1, was contacted with this nickel catalyst in the vertical tube reactor, as aforedescribed. There was obtained 1.6 percent yield of benzonitrile per pass.

Example 10

A sodium form type 13X zeolitic molecular sieve was ion-exchanged with copper ions to provide a catalyst containing, on the exchangeable sites, 59% sodium and 41% copper. Toluene and ammonia, in a molar ratio of ammonia to toluene of 90:1, was contacted with this copper catalyst in the vertical tube reactor, as aforedescribed. There was obtained 42 percent yield of benzonitrile per pass.

Example 11

A sodium form type 13X zeolitic molecular sieve was ion-exchanged with ammonium ions and then with iron ions to produce a catalyst containing, on the exchangeable sites, 30% sodium, 30% ammonium, and 40% iron. Toluene and ammonia, in a molar ratio of ammonia to toluene of 50:1, was contacted with this iron catalyst in the vertical tube reactor, as aforedescribed. There was obtained 34 percent yield of benzonitrile per pass.

Example 12

In the vertical tube reactor, p-xylene and ammonia, in a molar ratio of ammonia to p-xylene of 20:1, was contacted with the zinc catalyst described in Example 1. The liquid hourly space velocity was 0.25 and the temperature was 1000° F. There was obtained 19.4 percent yield per pass of p-tolunitrile and a small amount of terephthalonitrile under these conditions.

The foregoing examples illustrate the effectiveness of the process of this invention. As mentioned hereinbefore, the zeolite must contain a metal which forms a Werner ammine complex. Higher yields were found with catalysts having pore diameters greater than about 6 A.U. and such catalysts are preferred. In some runs, the effluent gases were acid scrubbed to remove ammonia and then analyzed for nitrogen and hydrogen, evidence of the extent of decomposition of the ammonia. It was found that a very minor amount of the ammonia was decomposed in this process. This is in marked contrast with prior art processes wherein large amounts of ammonia were decomposed and thus was not available for recycle.

Example 13

Commercial sodium form type 13X zeolitic molecular sieve was ion exchanged with rare earth metals. Toluene and ammonia, in a molar ratio of ammonia to toluene of 12:1, was contacted with this rare earth catalyst in the vertical tube reactor, as aforedescribed. There was obtained no benzonitrile using this catalyst.

Example 14

Toluene and ammonia, in a molar ratio of ammonia to toluene of 7:1, was contacted with commercial sodium form type 13X zeolitic molecular sieve in the vertical tube reactor, as aforedescribed. There was no benzonitrile produced.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing aromatic nitriles that comprises contacting ammonia and a lower alkyl-substituted aromatic hydrocarbon, in a molar ratio of ammonia to said hydrocarbon of at least about 2:1, at a temperature of between about 850° F. and about 1200° F., and for a contact time of between about 0.01 second and about 20 minutes, with a semi-porous refractory oxide having a heavy metal selected from the group of metals having atomic numbers of 23 to 30, inclusive, 43 to 48, inclusive, and 75 to 80, inclusive, ionically combined therewith.

2. The process defined in claim 1, wherein said lower alkyl-substituted aromatic hydrocarbon is a methyl-substituted aromatic hydrocarbon.

3. A process for producing aromatic nitriles that comprises contacting ammonia and a lower alkyl-substituted aromatic hydrocarbon, in a molar ratio of ammonia to said hydrocarbon of at least about 2:1, at a temperature of between about 800° F. and about 1200° F., and for a contact time of between about 0.01 second and about 20 minutes, with a zeolite having a heavy metal selected from the group of metals having atomic numbers of 23 to 30, inclusive, 43 to 48, inclusive, and 75 to 80, inclusive, ionically combined therewith.

4. A process for producing an aromatic nitrile that comprises contacting ammonia and a methyl-substituted aromatic hydrocarbon otherwise unsubstituted, in a molar ratio of ammonia to said hydrocarbon of between about 10:1 and about 100:1, at a temperature of between about 925° F. and about 1075° F., and for a contact time of about 0.1 second and about 60 seconds, with a zeolitic molecular sieve having a heavy metal selected from the group of metals having atomic numbers of 23 to 30, inclusive, 43 to 48, inclusive, and 75 to 80, inclusive, ionically combined therewith.

5. A process for producing benzonitrile that comprises contacting ammonia and toluene, in a molar ratio of ammonia to toluene of between about 10:1 and about 100:1, at a temperature of between about 925° F. and about 1075° F., and for a contact time of between about 0.1 second and about 60 seconds, with a zeolitic molecular sieve having zinc ionically combined therewith.

6. A process for producing tolunitrile and phthalonitrile that comprises contacting ammonia and xylene, in a molar ratio of ammonia to xylene of between about 10:1 and about 100:1, at a temperature of between about 925° F. and about 1075° F., and for a period of time of between about 0.1 second and about 60 seconds, with a zeolitic molecular sieve having zinc ionically combined therewith.

7. A process for producing benzonitrile that comprises contacting ammonia and toluene, in a molar ratio of ammonia to toluene of between about 10:1 and about 100:1, at a temperature of between about 925° F. and about 1075° F., and for a period of time of between about 0.1 second and about 60 seconds, with a zeolitic molecular sieve having silver ionically combined therewith.

8. A process for producing benzonitrile that comprises contacting ammonia and toluene, in a molar ratio of between about 10:1 and about 100:1, at a temperature of between about 925° F. and about 1075° F., and for a period of time of between about 0.1 second and about 60 seconds, with a zeolitic molecular sieve having nickel ionically combined therewith.

9. A process for producing benzonitrile that comprises contacting ammonia and toluene, in a molar ratio of ammonia to toluene of between about 10:1 and about 100:1, at a temperature of between about 925° F. and about 1075° F., and for a period of time of between about 0.1 second and about 60 seconds, with a zeolitic molecular sieve having cobalt ionically combined therewith.

10. A process for producing benzonitrile that comprises contacting ammonia and toluene, in a molar ratio of ammonia to toluene of between about 10:1 and about 100:1, at a temperature of between about 925° F. and about 1075° F., and for a period of time of between about 0.1 second and about 60 seconds, with a zeolitic molecular sieve having chromium ionically combined therewith.

11. A process for producing benzonitrile that comprises contacting ammonia and toluene, in a molar ratio of ammonia to toluene of between about 10:1 and about 100:1, at a temperature of between about 925° F. and about 1075° F., and for a period of time of between about 0.1 second and about 60 seconds, with a zeolitic molecular sieve having copper ionically combined therewith.

12. A process for producing benzonitrile that comprises contacting ammonia and toluene, in a molar ratio of ammonia to toluene of between about 10:1 and about 100:1, at a temperature of between about 925° F. and about 1075° F., and for a period of time of between about 0.1 second and about 60 seconds, with a zeolitic molecular sieve having iron ionically combined therewith.

References Cited by the Examiner

UNITED STATES PATENTS

| 1,920,795 | 8/1933 | Jaeger | 252—455 XR |
| 2,967,159 | 1/1961 | Gladrow et al. | 252—455 |
| 2,971,904 | 2/1961 | Gladrow et al. | 252—455 XR |

OTHER REFERENCES

Mahan et al., abstract of application 120,606, published June 5, 1951, O.G. 647.

CHARLES B. PARKER, *Primary Examiner.*